Patented Sept. 27, 1938

2,131,475

UNITED STATES PATENT OFFICE 2,131,475

PRESSURE EXERTING ELECTRODE

Franz R. Hensel and Earl I. Larsen, Indianapolis, Ind., assignors to P. R. Mallory & Co., Inc., Indianapolis, Ind., a corporation of Delaware No Drawing. Application April 27, 1937, Serial No. 139,340

4 Claims. (Cl. 219—4)

This invention relates to welding electrodes and more particularly to pressure exerting welding electrodes.

An object of the invention is to produce an improved pressure exerting welding electrode.

Other objects of the invention will be apparent from the following description taken in connection with the appended claims.

The present invention comprises the combination of elements, methods of manufacture, and the product thereof brought out and exemplified in the disclosure hereinafter set forth, the scope of the invention being indicated in the appended claims.

While a preferred embodiment of the invention is described herein, it is contemplated that considerable variation may be made in the method of procedure and the combination of elements without departing from the spirit of the invention.

In the resistance welding of metal parts the usual procedure is to pass an electric current through the parts to produce a local heating effect which results in the welding of the parts together. The current and pressure are usually applied by welding electrodes which are firmly pressed against the parts to be welded and which conduct the electric current to the welding area. Briefly, this is the procedure followed in all forms of resistance welding such as spot welding, seam welding, projection welding and the like.

Since the welding electrodes must conduct electric current and since heating is not generally desired except at the point where welding is to take place, it is desirable that the welding electrodes be of high electrical conductivity. Due to the heating which necessarily takes place at the point of welding, another requirement of a good welding electrode is that it shall be heat resistant, in other words that it shall not soften materially or change its electrical conductivity or other desirable properties at the temperatures developed during welding. It is particularly desirable that the electrodes shall not be softened sufficiently by the heat developed to be deformed by the pressure exerted in the welding operation. Where welding electrodes have been made of pure copper or of certain copper alloys in the past, deleterious mushrooming of the electrodes has frequently taken place resulting in an early destruction of the electrodes thereby requiring replacement.

The present invention contemplates a copper base electrode containing at least 99% copper and the remainder being composed of cobalt and beryllium. It is contemplated that both elements shall be present in at least useful amounts, for instance that they shall each comprise .05% of the alloy or more. It is desirable, although not absolutely necessary, that the beryllium content be equal to or less than the cobalt content, the ratio of cobalt to beryllium preferably falling within the range 1:1 to 2:1.

As an example, an alloy having the composition:—

| | Percent |
|---|---|
| Cobalt | .51 |
| Beryllium | .30 |
| Copper | Balance | was found to be well suited, after age-hardening, to use as a resistance welding electrode. This age hardened alloy attained a Brinell hardness of 230 and an electrical conductivity of 45%.

Such an electrode is suitable for pressure welding operations such as spot welding, seam and projection welding of lapped sheets of metal and electric riveting, which may be considered as a variation of resistance welding.

Heretofore, welding electrodes have been made of pure copper and of copper base alloys containing hardening ingredients. Whereas pure copper has the requisite high electrical conductivity it is so soft that it "mushrooms" excessively in use and therefore pure copper electrodes, where they can be used at all, require frequent replacement.

We are aware that welding electrodes consisting of copper-cobalt-beryllium are known. These electrodes contain about 2.6% cobalt, .4% beryllium and the balance copper. These materials have a comparatively high electrical conductivity and they can be improved by heat treating to obtain a Brinell hardness of 170 to 210 and an electrical conductivity of 36 to 44%.

We have discovered the surprising fact that by reducing the combined cobalt and beryllium contents from 3% to 1% or less, the hardness can be increased to 230 Brinell and the conductivity 45 to 50%.

A disadvantage which is connected with the alloy previously known is the comparatively high price of cobalt and beryllium. By decreasing the cobalt content of the alloy from 2.6% to .5%, we have been able to decrease the cost of cobalt addition from 6¢ to 1¢ per pound, at the present cobalt price of $2.50 per pound. At the same time we have been able to decrease the price of the beryllium addition from 11.3¢ to 7.8¢ per pound of alloy. Because of the necessarily high cost of an alloy containing 2.6% cobalt and .4% beryllium, this alloy has not been widely used in industry. Our new alloy overcomes this drawback, which automatically opens for it a wide field of commercial applications in the field of pressure welding electrodes, more widely in the field of current carrying members and electrical contacting members.

The alloy of the present invention can be made by well known methods. It can be used for resistance welding electrodes in the as cast condition as well as in the forged or extruded condition. Both the castings and the wrought material must receive a heat treatment to produce the desired physical and electrical properties.

The heat treatment may consist in quenching the alloy from a temperature above 700 degrees C. and aging it subsequently for various lengths of time below the temperature of 700 degrees C. If the material is being forged or extruded we have found that very desirable results are obtained by quenching the material from the high temperature, cold working it in the as quenched condition by means of cold hammering or cold drawing and applying the second heat treatment after the cold working. It is necessary to change the time-temperature conditions of the second heat treatment somewhat by using this procedure but we have found very excellent results are obtained, particularly as far as hardness and electrical conductivity are concerned.

In the manufacture of this alloy we have found it desirable to add the cobalt and beryllium in the form of a powder intimately mixed with copper and pressed into briquettes. It is possible to add a deoxidizing reagent to these briquettes and the loss of cobalt by using this procedure is extremely low.

We have found that the addition of small percentages of silicon and phosphorus are not detrimental, but in certain cases might actually be beneficial. This is particularly the case if the alloy contains a small percentage of manganese or nickel or iron.

While the present invention, as to its objects and advantages has been described herein as carried out in specific embodiments thereof, it is not desired to be limited thereby but it is intended to cover the invention broadly within the spirit and scope of the appended claims.

What is claimed is:

1. A pressure exerting electrode having a hard wear resisting contact surface comprising an age hardened alloy composed of at least 99% copper, the remainder being substantially cobalt and beryllium, with the ratio of cobalt content to beryllium content being within the range 1:1 to 2:1, both cobalt and beryllium being present in at least useful amounts.

2. A pressure exerting electrode having a hard wear resisting contact surface of an age hardened alloy consisting of at least 99% copper, about .5% cobalt and about .3% beryllium.

3. A pressure exerting electrode comprising an age hardened alloy of at least 99% copper, about .5% cobalt and about .3% beryllium, having a Brinell hardness of over 200 and a conductivity of over 45% that of copper.

4. A pressure exerting electrode having a hard wear resistant contact surface, comprising an age hardened alloy composed of at least 99% copper, the remainder being substantially cobalt and beryllium, with the beryllium content being approximately equal to the cobalt content, both cobalt and beryllium being present in at least useful amounts.

FRANZ R. HENSEL.
EARL I. LARSEN.